United States Patent

[11] 3,623,574

| [72] | Inventor | Robert L. Gardner<br>Gulf Breeze, Fla. |
|---|---|---|
| [21] | Appl. No. | 877,907 |
| [22] | Filed | Nov. 19, 1969 |
| [45] | Patented | Nov. 30, 1971 |
| [73] | Assignee | Vitro Corporation of America<br>New York, N.Y. |

[54] COUNTERBALANCE MECHANISM
7 Claims, 5 Drawing Figs.

[52] U.S. Cl. .................................................. 188/1 R,
74/89.15
[51] Int. Cl. ...................................................... F16d 65/00
[50] Field of Search .......................................... 74/89,
89.14, 89.15, 99, 14; 188/1 R, 1 B

[56] References Cited
UNITED STATES PATENTS
| 2,227,328 | 12/1940 | Steiss | 74/89 UX |
| 2,709,725 | 5/1955 | Bieber et al. | 74/89 UX |

*Primary Examiner*—Duane A. Reger
*Attorney*—Lawrence W. Hicks

ABSTRACT: A counterbalance mechanism that achieves its counterbalancing force by the rotation of a shaft which places load upon a spring column. A screw-type drive moves a block axially along the shaft to compress the column, thereby imposing the counterbalance load. This screw-type drive, therefore, limits the application of the counterbalancing force to only one direction of rotation, corresponding to placing a load on the spring column. Also, the counterbalancing force increases in proportion to the number of revolutions the shaft is rotated. The counterbalancing mechanism is ideally suited to oscillating loads, such as the movement of a radar antenna, so that when the antenna moves in one direction, away from its neutral position, one of a pair of counterbalance mechanisms can provide the counterbalancing force; while, when the antenna rotates in the opposite direction, the other of the pair of counterbalancing mechanisms can provide the opposite counterbalance force.

PATENTED NOV 30 1971 3,623,574

INVENTOR
ROBERT L. GARDNER

BY *Robert M. Wohlfarth*

ATTORNEY

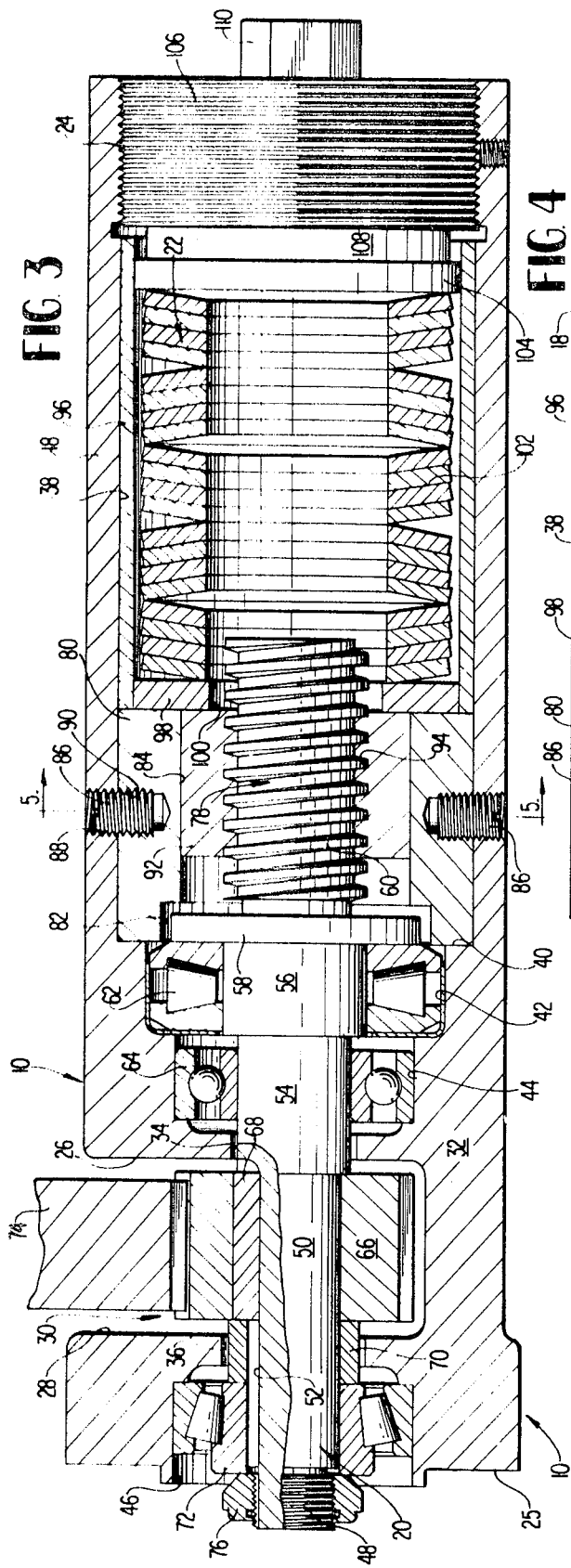
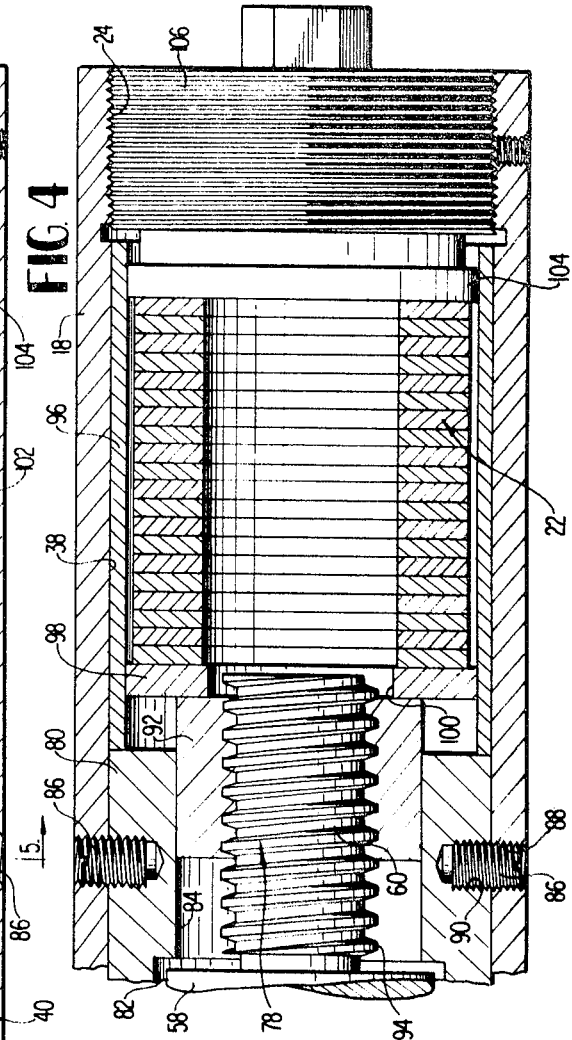
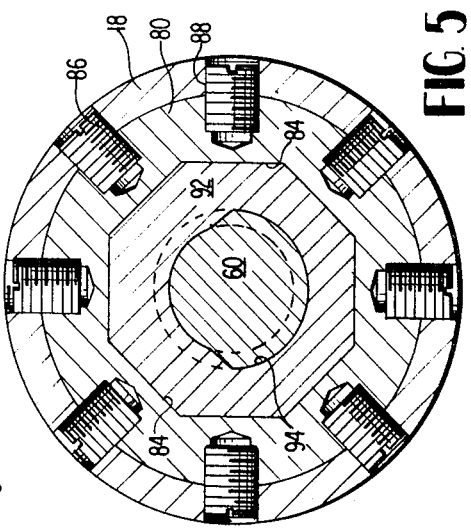

COUNTERBALANCE MECHANISM

BACKGROUND OF THE INVENTION

1. Field of the Invention

The invention relates to a counterbalancing mechanism that provides a counterbalancing force to react against the oscillating movement of a radar antenna. The design of the counterbalance mechanism is such that the antenna moves to the maximum angular displacement from its neutral position, the counterbalancing force provided by the mechanism is also at a maximum, thereby providing a necessary damping characteristic for the antenna movement.

2. Description of the Prior Art

In the prior art, springs have been used as the counterbalancing force for radar antennas due to the desirable characteristics of a spring as the load thereon is increased. In such applications of springs, whether it be tension or compression, as the load on the spring, corresponding to the excursion of the radar antenna from its neutral position increases, the load on the spring increased, thereby providing maximum load or counterbalancing force at the maximum excursion of the antenna. However, the inherent characteristics of a spring to return to its unloaded position, tended to reinforce the oscillating movement of the radar antenna as it moved from its maximum position to its neutral position. This reinforcement or tendency to increase the momentum of the antenna as it returned to its neutral position would increase the excursion movement in the opposite direction from the neutral position, thereby imposing greater demands on the counterbalancing mechanism on the opposite side. This tendency to reinforce the excursions of the antenna from its neutral position required complicated and expensive counterbalancing systems which introduced suitable damping.

SUMMARY OF THE INVENTION

This invention employs a column of belleville springs to provide a unique counterbalance mechanism that is particularly suited to the oscillation movement of a radar antenna. The counterbalance mechanism employs a central shaft with a column of belleville springs mounted in axial alignment therewith. A block is mounted on the shaft in threaded relation therewith to move axially along the shaft. The shaft is operatively connected to the radar antenna so that when the antenna oscillates the shaft is rotated. This rotation of the shaft causes the block to move axially along the shaft and when rotated in one direction will compress the column of belleville washers. Due to the characteristics of the belleville spring, as the shaft continues to rotate, the spring force will increase and the inherent friction between the belleville washers will introduce a damping factor. As the antenna moves back towards its neutral or zero position, the second counterbalance mechanism, constructed for opposite rotation, will provide the same counterbalance force for rotation in the opposite direction. As can be seen, as the antenna causes rotation of the shaft so as to move the block away from the column of belleville springs, thereby removing the compressive load, the worm drive relation between the block and the shaft prevents the spring column from driving or reinforcing the movement of the antenna from its maximum angular position back towards its zero or neutral position.

Thus, in one simple but unique counterbalance mechanism, the counterbalance force can be applied in ever-increasing amounts as the antenna departs from its zero or neutral position, without the heretofore reinforcement of the return movement of the antenna.

BRIEF DESCRIPTION OF THE DRAWINGS

FIG. 3 is a sectional view taken substantially along the line 3—3 of FIG. 2, with the spring column being shown in its noncompressed or neutral position.

FIG. 4 is a partial view of the mechanism of FIG. 3 showing the spring column in a compressed state, corresponding to the antenna's maximum excursion from its neutral position.

FIG. 5 is a sectional view taken substantially along the line 5—5 of FIG. 3.

DESCRIPTION OF THE INVENTION

Figure 2:
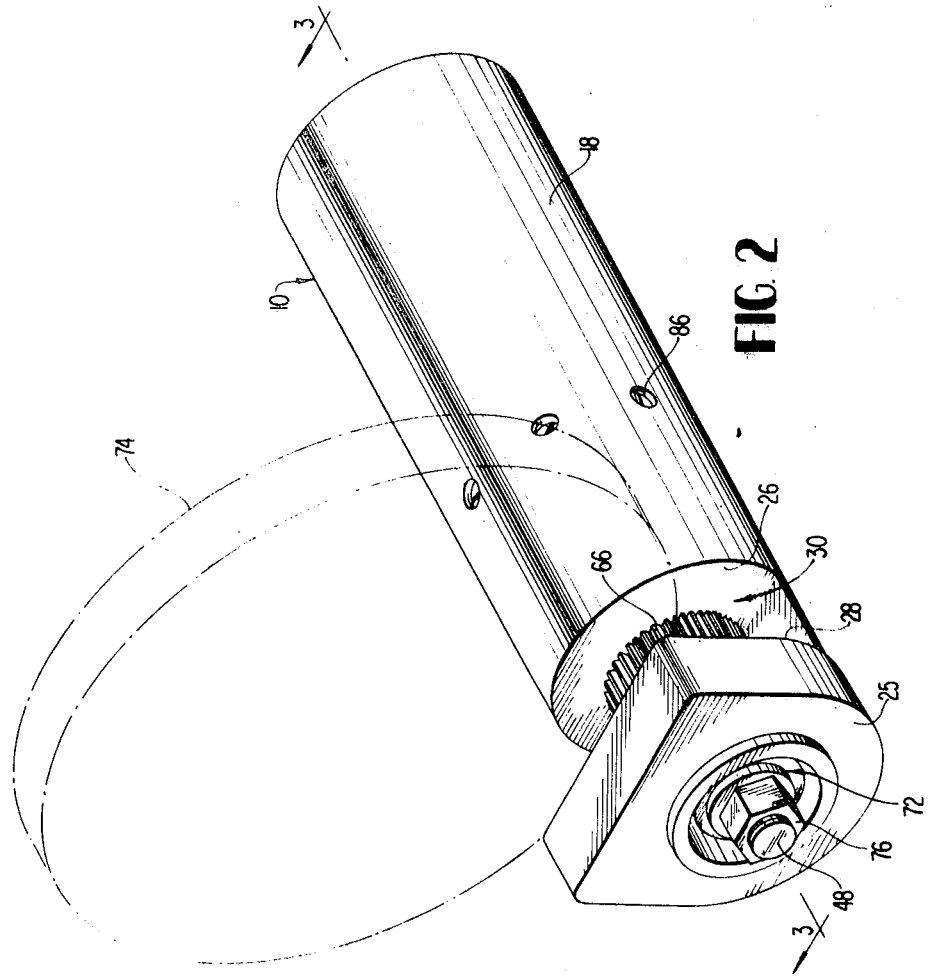
FIG. 2 is a perspective view of a counterbalance mechanism, with a gear shown in phantom that operatively connects the mechanism to the radar antenna.

Referring now to the drawings, the counterbalance mechanism is indicated generally by the numeral 10. In order to show the environment and the manner in which the mechanism 10 is used, a radar pedestal or mount 12 is shown with rotatable housing 14 mounted thereon. The antenna structure is mounted on an axis that extends longitudinally of the housing 14 and oscillates within the transverse opening 16 in the housing.

The counterbalance mechanism 10 has a main casing or housing 18 which has a drive shaft assembly 20 mounted concentrically therein at one end and a spring column assembly 22 mounted at the other end thereof. The housing 18 is an elongated cylindrical member which has a threaded opening at one end 24 thereof, and is closed at the other end 25 by a pair of abutments 26 and 28 that extend substantially across the radial extent of the casing 18. The abutments 26 and 28 form a cutout portion 30 which is defined by the abutments 26 and 28 and a sector 32 of the casing 18 that is not cut away on the circumference thereof. The abutments 26 and 28 have aligned openings 34 and 36, respectively, to receive the drive shaft assembly 20 therethrough.

The housing 18 has a main internal opening or cavity 38, that extends inwardly from the open end 24, which receives the spring column 22. The opening 38 terminates at an abutment or shoulder 40 which opens into a smaller concentric cavity 42. The cavity 42 in turn opens into a smaller concentric cavity 44 which terminates in the abutment 26 with the opening 34 therethrough being concentric with the cavities 42 and 44. Similarly, a cavity 46 extends inwardly into the abutment 28 in concentric relation with the opening 36 therethrough. It should be noted that the cavities 38, 42, 44, and 46, as well as the openings 34 and 36, are all concentric along the central axis of the housing 18.

The drive shaft assembly 20 is received inside the casing 18 and is inserted thereinto from the open end 24 thereof. One end of the shaft assembly has a threaded end 48 thereon with an elongated section 50, of constant diameter, with a keyway 52 cut along the sections 48 and 50. The section 50 terminates at a shoulder defined where a section 54 of slightly larger diameter begins. The length of the section 50 corresponding generally to the length of the housing 18 extending from the other end 25 of the casing to the abutment 26. The section 54 of the shaft corresponds generally to the length of the casing extending from the abutment 26 to the open end of the concentric cavity 44, where the section 54 terminates in a shoulder defined by the slightly larger diameter section 56 which is approximately the length of the cavity 42. The section 56 terminates in an enlarged radially extending flange 58 which lies within the end of the main internal opening 38 remote from the open end 24 thereof. The final section of the shaft assembly is a threaded portion 60 that extends from the flange 58 towards the open end 24 of the main opening 38.

The shaft assembly 20 is rotatably mounted in the casing 18 by installing a thrust-type bearing 62 on the shaft section 56 with one of the races of the bearing abutting against the flange 58. A radial bearing 64 is installed on the shaft section 54 near the shoulder that defines the section 56. The outside diameter of the thrust-type bearing 62 corresponds to the diameter of the cavity 42, and the outer diameter of the radial bearing 64 likewise corresponds to the diameter of the cavity 44, so that when the shaft assembly is inserted into the housing 18 the bearings will seat in the respective cavities. As the shaft assembly is inserted into the casing, the elongated section 50 thereof will extend through the opening 34 in the abutment 26. As section 50 slides across the cutout portion 30, a pinion gear 66 and key 68 are held in the opening so that the key will engage the keyway 52 and the pinion gear 66. Thus, with the pinion gear 66 so fixed on the elongated section 50 of the shaft, the bearings 62 and 64 will be properly seated in their respective cavities, with the elongated section extending through the opening 36 in the abutment 28 and the threaded end 48 of the shaft extending beyond the end 25 of the housing. A collar or spacer 70 is then installed on the shaft section 50 to abut and maintain the pinion gear 66 and its key 68 in position in the cutout portion 30 between the abutments 26 and 28. A combination thrust and radial-type bearing 72 is then installed on the shaft section 50 to seat in he cavity 46 and maintain the collar 70 in position against the gear 66 and key 68. Thus, if it is considered that the load is imposed on the shaft assembly at the pinion gear 66, the shaft is securely mounted on either side of the load point by both radial and thrust-bearing mounts. To maintain the drive shaft assembly and its mounting bearings in the proper position, a nut 76 is threaded onto the end 48 of the shaft assembly 20 to bear against the inner race of the bearing 72. Thus, the nut 76 will attempt to draw the shaft to the left, as viewed in FIG. 3, by the action of the flange 58 against the thrust bearing 62 and the radial bearing 64, which movement is prevented by the seating of the bearings in their respective cavities.

With the shaft assembly 20 thus securely mounted for rotation in the housing, the threaded portion 60 extends into the main internal cavity or opening 38 to cooperate with a linear screw drive arrangement 78. The screw drive 78 has a guide block 80 which has an outside circumference such as to facilitate mounting in the main cavity 38. The guide block 80 has a counterbore 82 to cooperate with the flange 58 so that when the guide block 80 is mounted in the end of the cavity 38 remount from the open end 24, the flange 58 is free to rotate without interference. The guide block 80 has an octagonal opening 84 in the center thereof that is concentric with the drive shaft assembly 20. The guide block 80 is secured against movement relative to the housing 18 by a series of screws 86 that extend inwardly from the outer surface of the housing through threaded openings 88 into corresponding threaded openings 90 in the guide block. A nut 92 has an octagonal outer contour to cooperate in sliding relationship with octagonal opening 84 in the guide block. The nut 92 has a threaded opening 94 through the center thereof to cooperate with the threaded end 60 of the drive shaft to linearly advance the nut 92 along the portion 60 as the shaft assembly 20 is rotated. Thus, as the shaft assembly is rotated, the nut 92 will advance in one direction along the threaded portion 60, and when the shaft is rotated in the opposite direction, the nut 92 will move in the opposite direction along the threaded portion 60.

The linear advance of the but 92 along the threaded portion 60 to the right, as viewed in FIGS. 3 and 4, is used to compress a spring column 22 to provide an ever-increasing load upon the shaft as the spring column is compressed from its "at rest" position, as shown in FIG. 3, to its position of the maximum compression as shown in FIG. 4. The spring column 22 has a sleeve or liner 96 which is inserted into the main opening or cavity 38 to abut at its inner end the guide block 80 and terminate adjacent to the threaded open end 24 of the housing. A large washer 98 has an external diameter such that it can be slideably received within the inner circumference of the sleeve 96 and has an opening 100 therethrough to provide clearance so that the threaded portion 60 of the drive shaft can extend therethrough. Thus, the sleeve 96 and the washer 98 provide a cylindrical container into which is inserted a column of belleville springs 102. The number and thickness of the belleville washers used in the column can be chosen according to the spring constant and damping characteristics that are required of the counterbalance mechanism. The other end of the container formed by the sleeve 96 and the washer 98 is closed by a solid disk 104 which provides an end plate or backing element against which the spring column can bear. A threaded plug 106 is received in the threaded opening 24 of the housing to provide a fixed abutment for the disk 104, and, by virtue of the continuous threads along the circumference thereof, a means to provide a predetermined load on the spring column 22. The threaded plug 106 has a reduced diameter section 108 whose diameter is less than the interior diameter of the sleeve 96 so that as the plug 106 is threaded into the opening, the disk 104 can be advanced toward the left, as shown in FIGS. 3 and 4, to provide the aforementioned preload on the spring column 22 when the device is in the "at rest" position as shown in FIG. 3. A nut-shaped lug 110 is provided on the exterior surface of the plug 106 to provide a convenient means to be engaged by a wrench to advance or withdraw the plug in the threaded opening 24. Thus, it is convenient not only to increase or decrease the predetermined load on the spring column 22, but also to withdraw the plug completely so as to change the column of belleville springs 102 so as to produce a different spring characteristic in the counterbalance mechanism.

Figure 1:
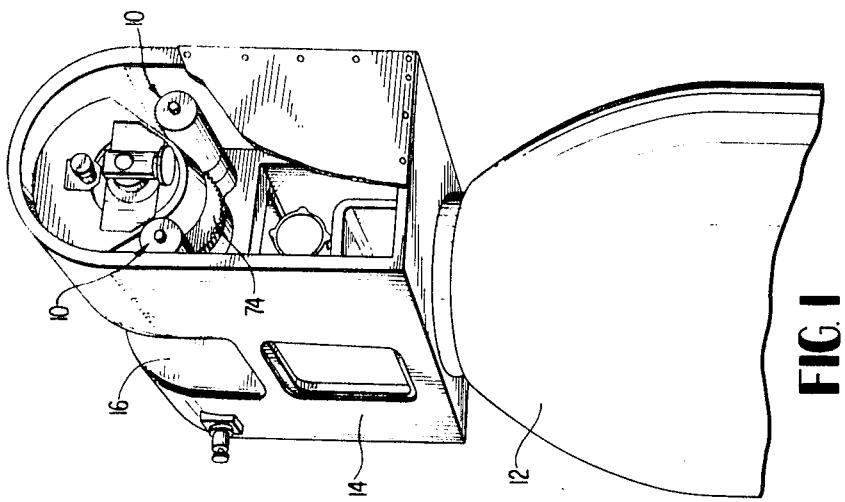
FIG. 1 is a perspective view of a radar antenna base and mounting assembly, with parts cut away for clarity, to show the installation of a pair of counterbalance mechanisms.

As can be seen from the above description of the linear screw drive arrangement 78, a change of the threads on the threaded portion 60 and the corresponding internal threads on the nut 92 from right-hand to left-hand threads, can produce linear advancement in either direction along the threaded portion 60 while the rotation of the shaft assembly 20 remains in the same direction. Thus, a pair of counterbalance mechanisms can be driven in the same direction of rotation, as shown in FIG. 1, and produce opposite movement of the nut 92 along the shaft portion 60. A pair of counterbalance mechanisms, such as set forth herein, can produce an increasing load in one unit, as the nut advances to the right as shown in FIG. 3, which the other unit with the opposite thread will cause the nut 92 to move to the left, thus causing the spring column to have no load.

The spring column 22 has been shown here to use belleville springs which make use of the inherent friction between adjacent springs, thereby providing a damping characteristic, as well as the compressive characteristics of the belleville springs. While this would be the preferred form, it is conceivable that an ordinary compression spring, or other compressive medium such as rubber could be used since the device requires that the compressed medium have a memory to return it to its uncompressed shape or volume.

As can be seen from the above description, a simple but unique counterbalance mechanism has been developed which is especially suitable, when used in opposite rotation pairs, as set forth above, to use with an oscillating device, such as a radar antenna that requires both a counterbalance force and a damping characteristic. Referring now to FIGS. 1 and 2, a typical installation of the subject device is shown. A drive gear 74, that is mounted on the shaft coinciding with the axis of rotation of the radar antenna, is shown engaged with the pinion gears 66 of a pair of devices to cause rotation of the shaft assemblies 20. In FIG. 2, one of the units 10 is shown engaged with the drive gear 74 of an antenna. Thus, as the antenna rotates from its neutral position towards a maximum angular displacement therefrom, one of the units will be increasingly loaded as the antenna moves toward its maximum position of displacement and the spring column is compressed. Thus, in the neutral position, the counterbalance units would be in the position shown in FIG. 3, while at its position of maximum displacement the unit would be in the position shown in FIG. 4 wherein the spring column has been compressed to its maximum degree, thereby providing the maximum counterbalance force. While this increasing load on one unit has been taking place, the opposite unit will be relatively unchanged, in that the nut 92 will move from the position shown in FIG. 3 to a position displaced to the left therefrom, wherein the nut 92 of this unit would be aligned near the flange 58. As the antenna progresses from its position of maximum deflection towards its neutral position, the counterbalance unit which has been compressed to its maximum position, as shown in FIG. 4, will be unloaded or, the nut 92 will move to the left until it is in the position shown in FIG. 3. Similarly, the other unit that had its nut 92 "idling" or simply moving to the left without imposing a compressive load on the spring column 22 will now move to the right until, when the antenna is in the neutral position, the nut 92 will be in the position shown in FIG. 3. When the antenna then moves towards the opposite maximum angle of deflection from the neutral position, the previously unloaded counterbalance unit will then have its drive nut 92 move from the position shown in FIG. 3 to the position of the maximum load shown in FIG. 4. Conversely, the counterbalance unit that had the load imposed thereon in the first example of deflection, will now be in the idling position of the first example.

What is claimed is:

1. A counterbalance mechanism, comprising:
   an elongated, hollow, cylindrical housing,
   an elongated, cylindrical drive assembly mounted for rotation within said housing, said drive assembly having a radial flange spaced between the ends thereof,
   a pinion gear fixed to one end of the drive assembly and engaging an object to be counterbalanced,
   a resilient load device,
   first means on the drive assembly to engage said resilient load device,
   second means to impose a load on said resilient load device, Whereby operation of the object to be counterbalanced causes rotation of said drive assembly relative to said housing with said first means moving relative to said drive assembly to progressively engage said load device causing a progressively greater resistive counterbalance force.

2. The device of claim 1 wherein the end of said drive assembly opposite said pinion gear has a continuous spiral screw thread thereon.

3. The device of claim 2 wherein said first means is a nut slidingly received in the housing with internal threads to cooperatively engage the thread on the end of said drive assembly, whereby rotation of said drive assembly will cause the nut to move axially along said end of the drive assembly.

4. The device of claim 3 wherein said resilient load device is a compression spring mounted in said housing adjacent to the other end of said drive assembly whereby rotation of said drive assembly in one direction will cause the nut to move axially toward the spring thereby compressing it, and rotation in the opposite direction will cause the nut to move away from the spring thereby removing the compressive load thereon.

5. The device of claim 4 wherein said spring is a column of belleville springs.

6. The device of claim 5 wherein said second means to impose a load is an abutment threadedly received in the end of said casing to engage the spring.

7. The device of claim 6 whereby in a pair of mechanisms the screw threads of one mechanism are right hand and the screw threads of the other are left hand, thereby causing opposite movement of the one nut relative to the other nut when a gear attached to the load engages the one and the other pinion for the same rotation.

* * * * *